Patented Aug. 8, 1939

2,169,007

UNITED STATES PATENT OFFICE 2,169,007

METHOD OF MAKING HARD METAL BODIES

Johan Romp, Eindhoven, Netherlands, assignor to N. V. Philips' Gloeilampenfabrieken, Eindhoven, Netherlands No Drawing. Application August 1, 1938, Serial No. 222,540. In Germany August 9, 1937

2 Claims. (Cl. 75—137)

My invention relates to making bodies by compressing a pulverulent mixture of tungsten-carbide and cobalt, and then sintering the same by heating in a non-oxidizing atmosphere.

To insure that such a body will have a compact or dense structure, it is necessary that the carbon content be maintained within very narrow limits, because either an excessively high carbon content or an excessively low carbon content causes the body to be porous. In the former case the excess of carbon remains in the material as a nonmetallic enclosure, and in the second case the shortage of carbon makes the mixture less suited for sintering.

The carbon content of the final body is influenced by the medium in which the sintering process is effected. For example, if the sintering takes place in a carbonaceous medium which contains, for example, elementary carbon or organic carbon compounds, the carbon content will be increased, whereas if it takes place in a nonoxidizing medium free from carbon, such as hydrogen, the body will be decarbonized.

If the body during the sintering process is located within a non-oxidizing atmosphere and supported on a fixed substratum, for example of carbon, the upper and the lower sides of the finished body will obtain different proportions of carbon. Because of this, undesirable warping of the bodies frequently occurs. Although this warping may be obviated to some extent by embedding the body wholly within a pulverulent material, this will not overcome the above-mentioned difficulties of carbon absorption or decarbonization, and as a result there will be a difference in compactness between the edge zone and the core of the bodies.

The object of my invention is to overcome the above difficulties and to provide a method of producing such bodies by means of which the final body will be compact, will not be distorted, and will have the desired carbon content.

In accordance with the invention, I use a nonoxidizing sintering process during which the body is placed within a pulverulent embedding material which comprises a mixture of carbon and a highly refractory inert substance. I so select the carbon content of this material that the sintered body will have a uniform compactness throughout.

The term "inert refractory substance" as used herein and in the claims is to be understood to mean a substance which is unaffected during the sintering process.

When the pulverulent tungsten-carbide-cobalt starting mixture has initially the correct carbon content, it is generally desirable to use an embedding material having such a carbon content that during the sintering operation in the nonoxidizing atmosphere, the carbon of the mixture is neither absorbed nor decarbonized. On the other hand, if the starting mixture should have a different carbon content, this may be corrected to a large extent during the sintering operation by adjusting the content of carbon of the embedding material.

In order that the invention may be clearly understood and readily carried into effect, I shall describe the same in more detail with reference to the following example:

Example

A pulverulent mixture of tungsten-carbide containing about 6% carbon and of 5% cobalt is compressed to form a molded body. This body is then embedded within a pulverulent mixture of about 30% sugar carbon and about 70% alumina ($Al_2O_3$). The embedded body is then heated for an hour at about 1450° C. in a stream of hydrogen to sinter it into the final body.

A microscopic assay with a hundredfold magnification of the unetched "Schliff" (microsection) showed that in a body produced by the above method there was no difference in compactness between the edge zone and the core.

Instead of using the alumina, other highly-refractory oxides that will not be reduced under the conditions of the sintering operation, such as zirconium oxide ($ZrO_2$), thoriumoxyde ($ThO_2$), may be used. The requisite ratio of carbon and oxide in the embedding material for any given tungsten-carbide-cobalt starting material can be readily ascertained by one skilled in the art by carrying out a few trial sintering operations.

While I have described my invention with a specific example and in connection with certain materials, I do not wish to be limited thereto, but desire the appended claims to be construed as broadly as permissible in view of the prior art.

What I claim is:

1. A method of making a hard metal body comprising the steps of compressing a pulverulent mixture of tungsten-carbide and cobalt into a molded body, embedding the molded body within a pulverulent mixture of a highly-refractory inert substance and an amount of carbon selected to produce a uniformly compact body, and heating the embedded body in a non-oxidizing atmosphere to sinter the same.

2. A method of making a hard metal body comprising the steps of compressing into a molded body a pulverulent tungsten-carbide-cobalt mixture containing the amount of carbon desired in the hard metal body, embedding the molded body within a pulverulent mixture of carbon and a highly-refractory inert substance, and heating the embedded body in a non-oxidizing atmosphere to sinter the mixture while retaining the initial carbon content.

JOHAN ROMP.